(12) United States Patent
Dawe

(10) Patent No.: US 11,230,345 B2
(45) Date of Patent: Jan. 25, 2022

(54) BICYCLE HANDLEBAR FOR RECUMBENT CYCLING

(71) Applicant: Daniel Dawe, Delphons, OH (US)

(72) Inventor: Daniel Dawe, Delphons, OH (US)

( * ) Notice: Subject to any disclaimer, the term of this patent is extended or adjusted under 35 U.S.C. 154(b) by 147 days.

(21) Appl. No.: 16/714,896

(22) Filed: Dec. 16, 2019

(65) Prior Publication Data

US 2020/0207439 A1 Jul. 2, 2020

Related U.S. Application Data

(60) Provisional application No. 62/785,587, filed on Dec. 27, 2018.

(51) Int. Cl.
*B62K 21/12* (2006.01)
*B62K 3/00* (2006.01)

(52) U.S. Cl.
CPC ............ *B62K 21/125* (2013.01); *B62K 3/005* (2013.01)

(58) Field of Classification Search
CPC ... B62K 21/125; B62K 3/005; Y10T 74/2078; Y10T 74/20822; Y10T 74/20828
USPC ....... 280/270, 288.4; 74/551.1, 551.8, 551.9, 74/544
See application file for complete search history.

(56) References Cited

U.S. PATENT DOCUMENTS

| | | | |
|---|---|---|---|
| 5,145,210 A | 9/1992 | Lennon | |
| 5,195,394 A | 3/1993 | Latta | |
| 6,662,680 B2 * | 12/2003 | Rocket | B62K 21/125 74/551.1 |
| 8,083,247 B2 * | 12/2011 | Lee | B62J 29/00 280/288.4 |
| 10,167,039 B1 * | 1/2019 | Manuel | B62J 27/00 |
| 2002/0144568 A1 * | 10/2002 | Chen | B62K 21/12 74/551.7 |
| 2008/0202281 A1 | 8/2008 | Bruyere | |
| 2010/0186545 A1 | 7/2010 | Ray | |
| 2010/0206652 A1 | 8/2010 | Kielland | |

* cited by examiner

*Primary Examiner* — Kevin Hurley
*Assistant Examiner* — Hosam Shabara
(74) *Attorney, Agent, or Firm* — Michael C. Balaguy

(57) ABSTRACT

A handlebar assembly is able to attach to a bicycle. The handlebar assembly provides a higher grasping point for a bicycle operator than the original handlebar, enabling the operator to lean back and assume a recumbent posture while riding. The handlebar assembly includes and attachment member, a handlebar member, and an extension vertically separating the two components. The attachment-member is able to affix about the existing tubular handlebar of the bicycle by means of a clamp.

14 Claims, 5 Drawing Sheets

BICYCLE HANDLEBAR FOR RECUMBENT CYCLING

CROSS-REFERENCE TO RELATED APPLICATION(S)

The present application is related to and claims priority to U.S. Provisional Patent Application No. 62/785,587 filed Dec. 27, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of bicycles of existing art and more specifically relates to therapeutic bicycle accessories.

RELATED ART

Bicycles are a popular, economical, and healthy form of transportation. Unfortunately, the advantages of using bicycles are inaccessible to many individuals because of back problems or other physical disadvantages that make the upright or forward-leaning posture necessary for operating a bicycle impractical or even painful. It is known in the art to provide specialty recumbent bicycles which enable an operator to lean back (usually against a seatback) in order to assume a better posture while riding. However, such recumbent bicycles are often ungainly, produce reduced pedaling power, and are prohibitively expensive. A superior solution for providing a recumbent seating position on a bicycle is desired.

U.S. Pat. No. 5,195,394 to Richard S. Latta relates to a bicycle handlebar extension. The described bicycle handlebar extension includes an inverted U-shaped member secured at its lower ends to outer portions of a racing style handlebar and has a stabilizer strut secured between an upper crossbar of the U-shaped member and a gooseneck which mounts the handlebar on the bicycle. The stabilizer strut extends at an acute angle to a plane defined by the U-shaped member to eliminate cantilever forces on the junctions between the U-shaped member and the outer handlebar portions.

SUMMARY OF THE INVENTION

In view of the foregoing disadvantages inherent in the known cycling art, the present disclosure provides a novel bicycle handlebar for recumbent cycling. The general purpose of the present disclosure, which will be described subsequently in greater detail, is to provide a bicycle handlebar able to convert a tradition bicycle designed for riding with an upright posture to a bicycle that enables a rearward-leaning posture.

A handlebar assembly is able to attach to a bicycle. The handlebar assembly provides a grasping point for a bicycle operator which is higher and more rearward than the original handlebar, enabling the operator to lean back and assume a recumbent posture while riding. The handlebar assembly includes and attachment member, a handlebar member, and an extension vertically separating the two components. The attachment-member is able to affix about the existing tubular handlebar of the bicycle by means of a clamp.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a bicycle handlebar for recumbent cycling, constructed and operative according to the teachings of the present disclosure.

The various embodiments of the present invention will hereinafter be described in conjunction with the appended drawings, wherein like designations denote like elements.

DETAILED DESCRIPTION

Figure 1:
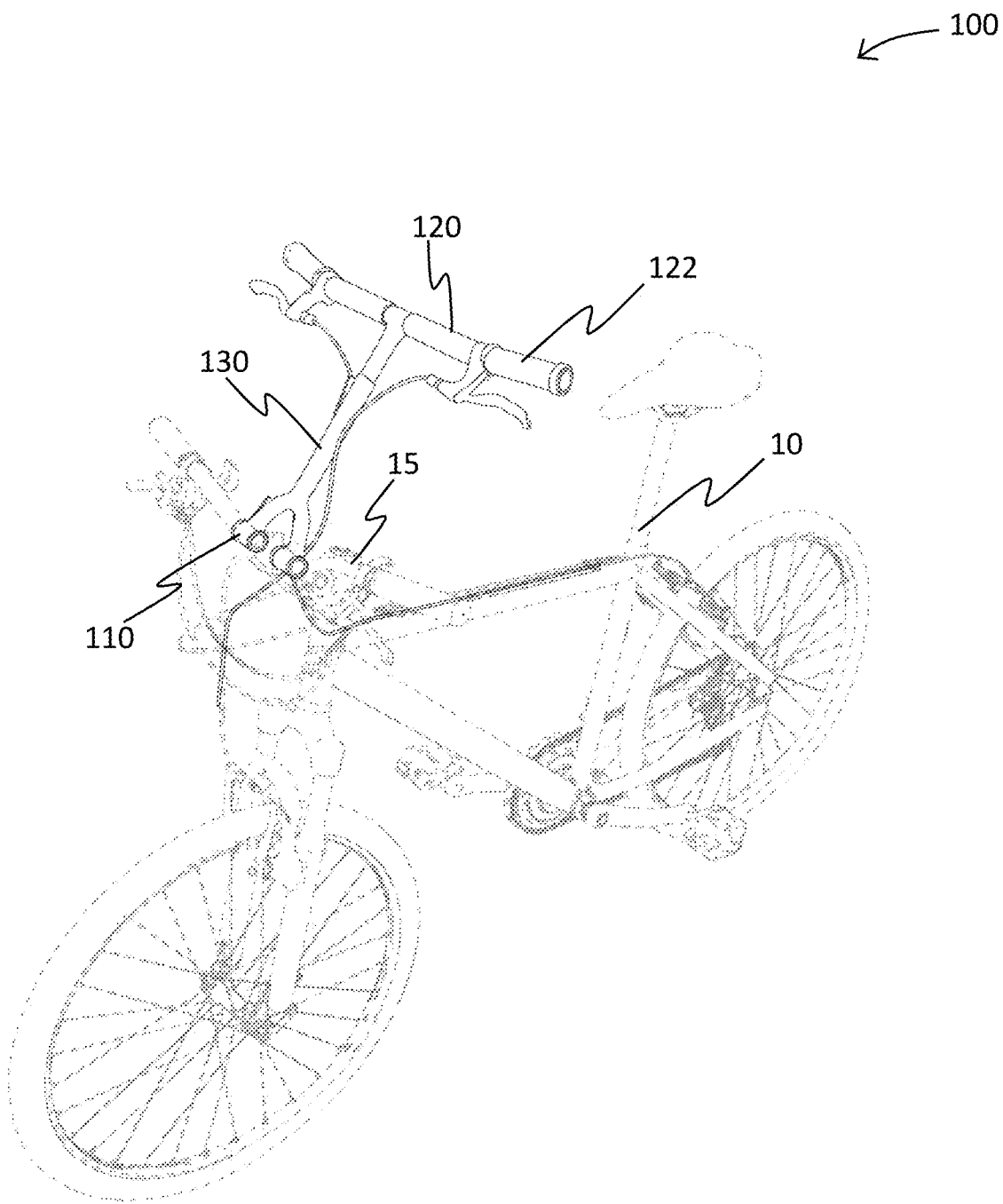
FIG. 1 is a perspective view of the handlebar assembly during an 'in-use' condition, according to an embodiment of the disclosure.

As discussed above, embodiments of the present disclosure relate to a therapeutic bicycle accessory and more particularly to a bicycle handlebar for recumbent cycling as used to improve the posture of a bicycle operator.

Briefly stated, the recumbent handlebar attachment system is a handlebar extension. The extension allows for a user to modify a bicycle such that a handlebar is closer to the seated user. By allowing the handlebar to be closer to the seated user, the recumbent handle bar attachment system allows a user to operate the bicycle in a "recumbent" position. This recumbent position may eliminate strain from the back, shoulders, and neck while operating a bicycle. When attached a user may choose to use the existing handlebars or the extension. The recumbent handlebar attachment system is preferably fully adjustable. A user may adjust the handlebar up, down, extended, retracted, forward and/or backwards. The recumbent handlebar attachment system may comprise of an auxiliary handlebar attachment that fits to the existing handlebar of a bicycle. The recumbent handlebar attachment is easily attachable to any style of bicycle that includes a set of handlebars.

In one embodiment of the present invention, recumbent handlebar attachment systems may comprise an axillary handlebar for a bicycle. The auxiliary handlebar may include any number of fastening mechanisms that allow for a user to attach the auxiliary handlebar to the existing handlebar of the bicycle.

The recumbent handlebar attachment system includes at least one attachment point. The attachment point defines where the auxiliary handlebar system is in contact with the existing handlebar. In some embodiments, the recumbent handlebar attachment system may have more than one attachment point(s). In these embodiments, the recumbent handlebar attachment system includes a number of supports matching the number of attachment points. The attachment point may have many embodiments.

In one embodiment the attachment point may include a C-clamp style fastening mechanism. The C-Clamp is a two-piece, bifurcated clamp having a base member and a cap, similar to a piston rod of an internal combustion engine. The C-clamp fastener may be sized to partially envelop a section along the length of the existing handlebar. The C-style clamp includes a tightening mechanism that allows the attachment point to remain in a fixed location. Further means of affixing the recumbent handlebar attachment system at the attachment points are pondered.

The recumbent handlebar includes three main components: the attachment point; a handlebar to be gripped by a user; an extension that connects the attachment point to the handlebar. In some embodiments the extension that connects the attachment point to the handlebar may be adjustable. The extension may include a telescopic functionality that allows a user to set the length of the extension.

The attachment points may embody a C-clamp that at least partially circumscribes the perimeter of the existing handlebar of the bicycle. Further means to statically secure the recumbent handlebar attachment system to the existing handlebars are considered. Connected in series to the attachment points, as shown, is the extension. In the present embodiment, the extension has telescopic functionality.

The telescopic functionality preferably allows a user to expand and retract the extension as per user preference. Attached in series to the extension is the recumbent handlebar portion. The recumbent handlebar portion may be used as a second available handlebar. Using the recumbent handlebar portion allows a user to lean back in a recumbent position while operating the bicycle. The handlebar portion may include mechanisms to operate the brakes on the bicycle.

The recumbent handlebar system may lie in a vertical plane that differs from that of the existing handlebars of the cycle. A brake lever and a cable extension may be integrated into the recumbent handlebar system. As such, the extensions may be connectable to the existing brake cables and/or brake assemblies existing on the cycle. Further, if the cycle includes a clutch assembly, a clutch cable assembly may be included on the recumbent handlebar system.

The handlebars of the recumbent handlebar system may be horizontally extendable and/or shortenable (e.g., in an axis perpendicular from the normal rotation of tires of the existing cycle), both inwardly and outwardly. As such, the handlebars may be secured in the extended and/or shortened position via any means. For example, the handlebars may be secured via clips, pushbuttons, button release, cam-lock, pins, secured via twisting/friction-lock, or any other suitable means.

A traction member (also referred to as a ribbed sleeve) may be incorporated to fit between the clamp and the handlebar. The traction member may comprise rubber and have a high coefficient of friction. The traction member may attach to the handlebar of the bicycle. The C-clamp may be attached over the traction member. The C-clamp coupled with the traction member allows the attachment point to retain the recumbent handlebar attachment system in a static position, thus disallowing the recumbent handlebar attachments system from rotating in relation to the existing handlebars of the cycle. The exact specifications, materials used, and method of use of the recumbent handlebar attachment system may vary upon manufacturing.

The system may also include a lever which, when released, allows the handlebars to pivot about the clamps. This feature serves two important purposes. First, it allows the user to adjust the angle of the handlebars for a maximally comfortable configuration. Second, it allows the user to swing the handlebars forward and out of the way when mounting and dismounting the bike. Because the handlebars taught are higher and further back on the bicycle than traditional handlebars, this feature is important in allowing cyclists to easily get on and off of the bicycle.

For the purposes of this specification, a tee is a geometric arrangement of three members which for the shape of a letter "T".

Referring now more specifically to the drawings by numerals of reference, there is shown in FIGS. 1-4, various views of a handlebar assembly 100.

FIG. 1 shows a handlebar assembly during an 'in-use' condition according to an embodiment of the present disclosure. Here, the handlebar assembly may be beneficial for use by a user to convert a traditional bicycle to a bicycle enabling a recumbent seating position. As illustrated, handlebar assembly 100 may be able to attach to bicycle 10, effectively raising the handlebars of bicycle 10. In this way, handlebar assembly 100 may enable a bicycle-operator to assume a recumbent posture while operating bicycle 10. Handlebar assembly 100 may include attachment-member 110, handlebar-member 120, and extension-member 130. Attachment-member 110 may be able to affix around tubular handlebar 15 by means of at least one clamp 112. Handlebar-member 120 may have at least two handles 122. Extension-member 130 may vertically separate handlebar-member 120 from attachment-member 110 by a sufficient distance to enable the operator to lean backwards from a vertical posture while grasping handlebar-member 120. Preferably, attachment-member 110, handlebar-member 120, and extension-member 130 may be constructed of metal and may be rigidly affixed to each other by welding or other means.

Figure 2:
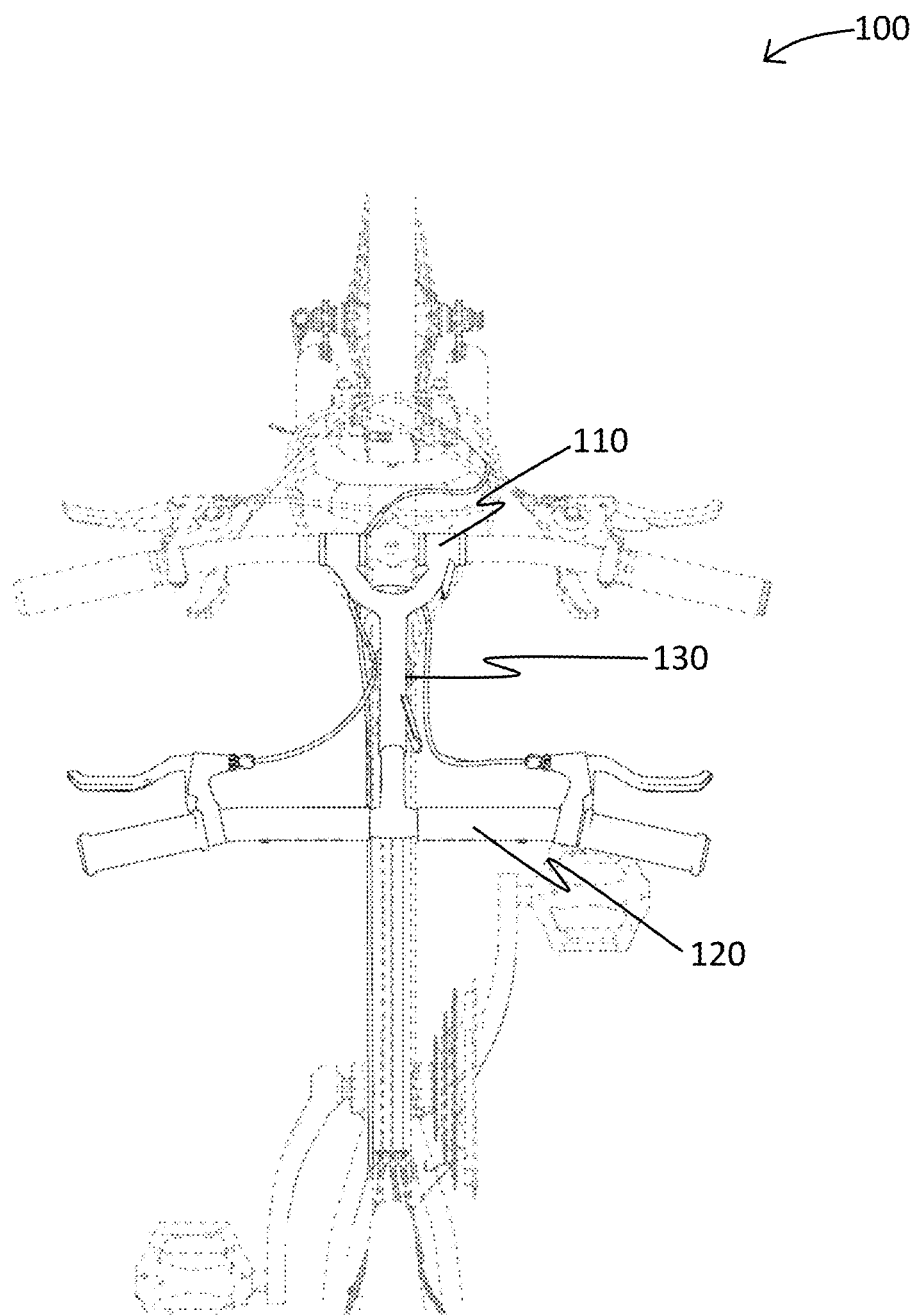
FIG. 2 is a top perspective view of the handlebar assembly of FIG. 1, according to an embodiment of the present disclosure.

FIG. 2 shows a top perspective view of the handlebar assembly 100 of FIG. 1, according to an embodiment of the present disclosure. As above, the handlebar assembly 100 may include attachment-member 110, handlebar-member 120, and extension-member 130.

Figure 3:
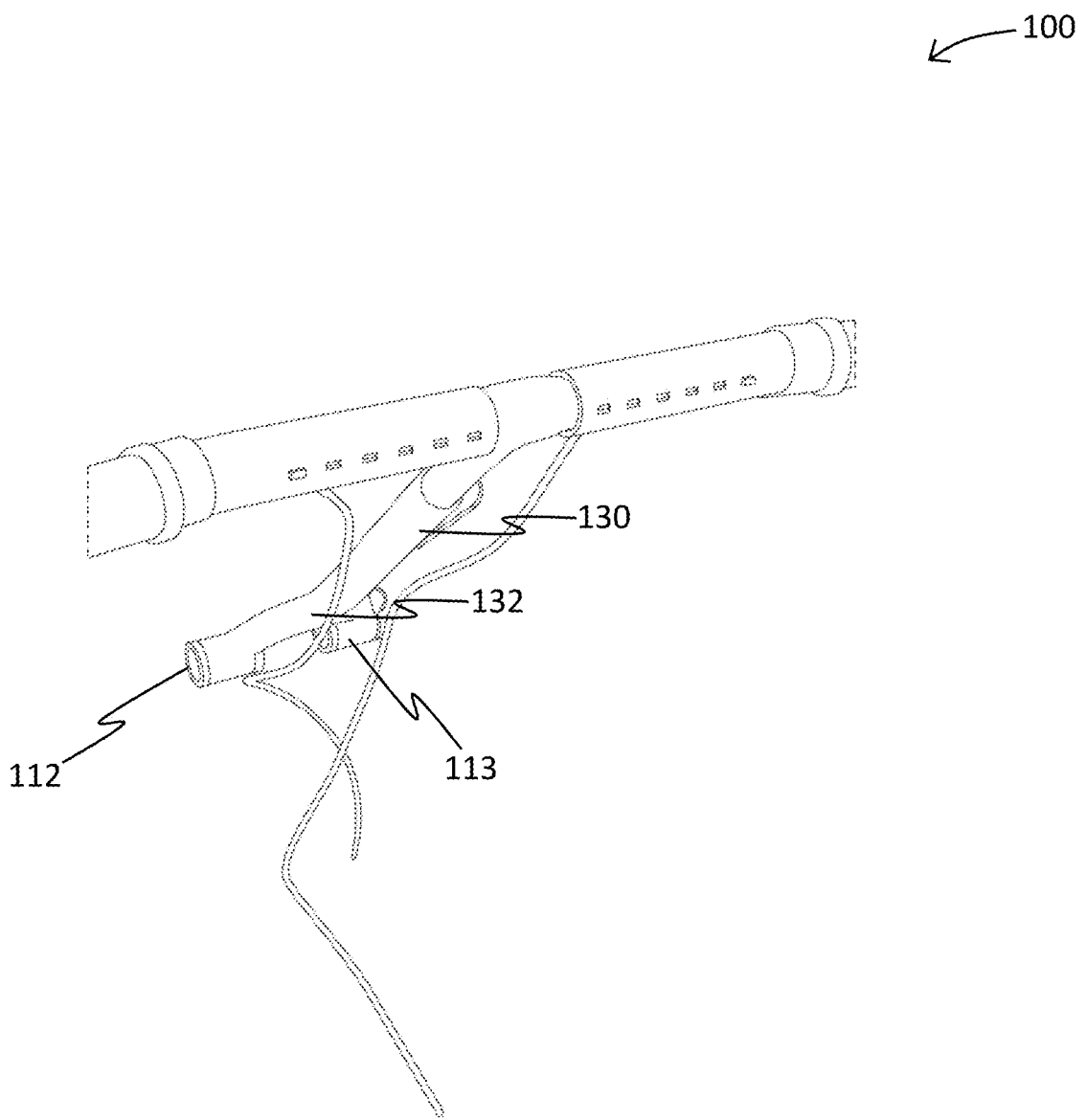
FIG. 3 is a perspective view of the handlebar assembly of FIG. 1, according to an embodiment of the present disclosure.

FIG. 3 is a perspective view of the handlebar assembly 100 of FIG. 1, according to an embodiment of the present disclosure. As illustrated, at least one clamp 112 (FIG. 1) comprises two coaxial circular clamps 113, such that each of the two coaxial circular clamps 113 are able to simultaneously affix to tubular handlebar 15 (FIG. 1). Each of the two coaxial circular clamps 113 may be joined to extension-member 130 by Y-shaped yoke 132. Extension-member 130 may be a unitary tubular member. Alternatively, extension-member 130 may be of adjustable length by a telescoping mechanism or other solution. Extension-member 130 may be perpendicular to the axis of the circular inner surface of at least one clamp 112.

Figure 4:
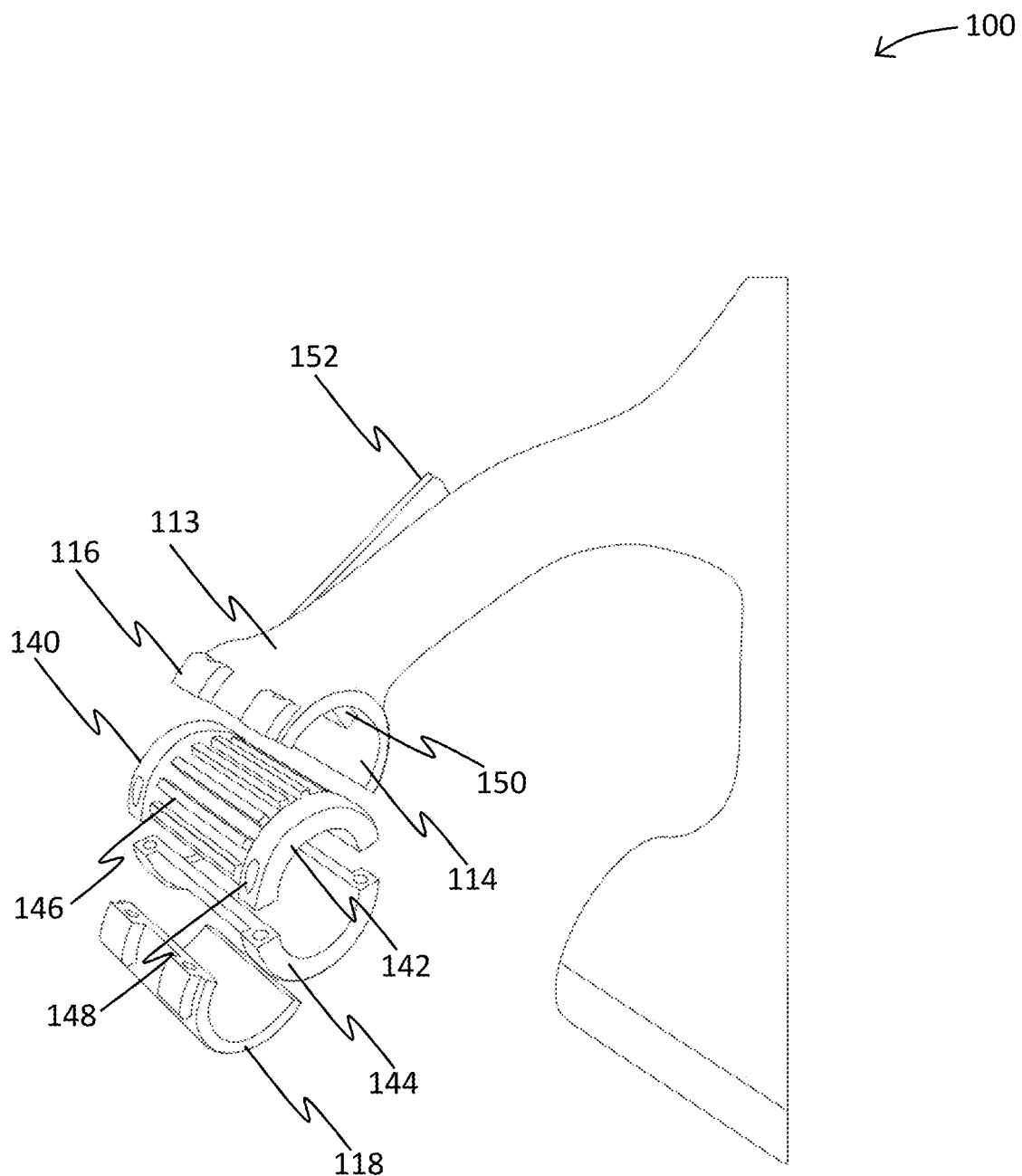
FIG. 4 is a disassembly view of the handlebar assembly of FIG. 1, according to an embodiment of the present disclosure.

FIG. 4 is a perspective view of the handlebar assembly of FIG. 1 disassembled, according to an embodiment of the present disclosure. Handlebar assembly 100 may also include at least one ribbed sleeve 140. Ribbed sleeve 140 may have a curved inner surface able to circumscribe and snugly contact tubular handlebar 15 (FIG. 1), preferably with such conformity that it is able to be secured by a friction fit when clamped about tubular handlebar 15 (FIG. 1). At least one ribbed sleeve 140 may include plurality of ribs 146, which protrude radially about an exterior of at least one ribbed sleeve 140. Each of the two coaxial circular clamps 113 may themselves include clamp-rib 150 which is complementary and indexable to at least one ribbed sleeve 140, such that when each of the two coaxial circular clamps 113 are affixed over at least one ribbed sleeve 140, clamp-rib 150 indexes to at least one ribbed sleeve 140, and each of the two coaxial circular clamps 113 is securely fixed in an angular position around tubular handlebar 15 (FIG. 1) as restrained by the engagement of clamp-rib 150 with at least one ribbed sleeve 140. In this way, ribbed sleeve 140 clamps over tubular handlebar 15 (FIG. 1), and the clamps 113 clamp over ribbed sleeve 140, securely fixing handlebar assembly 100 in a fixed relationship to bicycle 10 (FIG. 1). However, clamp-rib 150 in some embodiments may be retractable by lever 152 which rotatably mounted within attachment-member 110 (FIG. 1), such that a user may adjust an angle of handlebar assembly 100 (FIG. 1) relative to bicycle 10 (FIG. 1) by retracting lever 152 and moving handlebar-member 120 (FIG. 1).

As shown, at least one ribbed sleeve 140 may be bifurcated into two sleeve-halves 142 and 144, two sleeve-halves 142 and 144 being able to be fastened to tubular handlebar 15 (FIG. 1) by threaded fasteners which are able to clamp two sleeve-halves 142 and 144 about tubular handlebar 15 (FIG. 1), the threaded fasteners being able to pass through a first of two sleeve-halves 142 and 144 into at least one threaded bore 148 of a second of two sleeve-halves 142 and 144. Each of the two coaxial circular clamps 113 may likewise be bifurcated into extension-end 116 and clamp-cap 118, each of extension-end 116 and clamp-cap 118 having inner clamp-surfaces 114 able to each circumscribe one-hundred-and-eighty degrees of ribbed sleeve 140, clamp-cap 118 being able to be bolted to extension-end 116 about tubular handlebar 15 and alternatively about ribbed-sleeve 140. Each of plurality of ribs 146 and clamp-rib 150 may be rectangularly shaped. Clamp-rib 150 may be spring-loaded into a protruded position.

Figure 5:
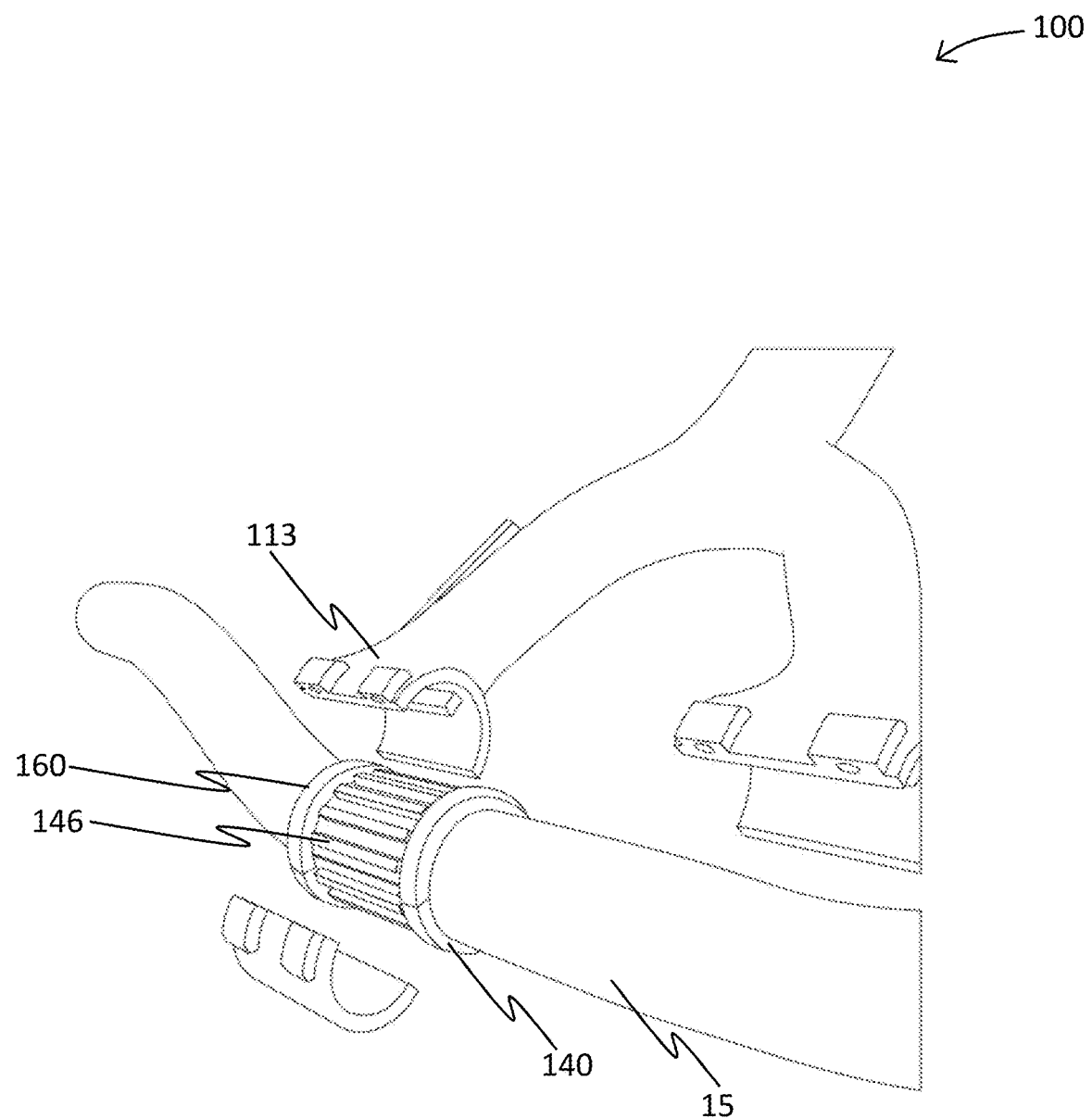
FIG. 5 is a perspective view of the handlebar assembly of FIG. 1 being assembled about tubular handlebar, according to an embodiment of the present disclosure.

FIG. 5 is a perspective view of the handlebar assembly 100 of FIG. 1 being assembled about tubular handlebar 15, according to an embodiment of the present disclosure. At least one ribbed sleeve 140 may have flanges 160 bounding the left and right ends of at least one ribbed sleeve 140, such that flanges 160 extend radially above plurality of ribs 146, flanges 160 preventing each of the two coaxial circular clamps 113 from migrating left or right off of at least one ribbed sleeve 140 when indexed to and clamped about plurality of ribs 146.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A handlebar assembly able to attach to a bicycle, the handlebar assembly enabling a bicycle-operator to assume a recumbent posture while operating the bicycle, the handlebar assembly comprising:
   an attachment-member able to affix around a tubular handlebar, the attachment-member comprising at least one clamp, the at least one clamp having a circular inner surface, the circular inner surface circumscribing an axis;
   a handlebar-member comprising at least two handles; and
   an extension-member vertically separating the handlebar-member from the attachment-member by a sufficient distance to enable the operator to lean backwards from a vertical posture while grasping the handlebar-member, the extension-member attaching to a center of the handle-bar member;
   wherein the extension-member and the at least two handles in combination form a tee; and
   wherein the handle-bar member and the extension-member each comprise a tubular construction;
   wherein the at least one clamp comprises two coaxial circular clamps, each of the coaxial circular clamps able to affix to the tubular handlebar.

2. A handlebar assembly able to attach to a bicycle, the handlebar assembly enabling a bicycle-operator to assume a recumbent posture while operating the bicycle, the handlebar assembly comprising:
   an attachment-member able to affix around a tubular handlebar, the attachment-member comprising at least one clamp, the at least one clamp having a circular inner surface, the circular inner surface circumscribing an axis;
   a handlebar-member comprising at least two handles; and
   an extension-member vertically separating the handlebar-member from the attachment-member by a sufficient distance to enable the operator to lean backwards from a vertical posture while grasping the handlebar-member, the extension-member attaching to a center of the handle-bar member;
   wherein the extension-member and the at least two handles in combination form a tee; and
   wherein the handle-bar member and the extension-member each comprise a tubular construction;
   further comprising at least one ribbed sleeve able to circumscribe the tubular handlebar, the at least one ribbed sleeve including a plurality of ribs protruding radially about an exterior of the at least one ribbed sleeve, and wherein the at least one clamp comprises a clamp-rib which is complementary and indexable to the at least one ribbed sleeve, such that when the at least one clamp is affixed over the at least one ribbed sleeve, the clamp-rib indexes to the at least one ribbed sleeve, and the at least one clamp is securely fixed in an angular position around the tubular handlebar as restrained by the engagement of the clamp-rib with the at least one ribbed sleeve.

3. The handlebar assembly of claim 2, wherein the at least one ribbed sleeve is bifurcated into two sleeve-halves, the two sleeve-halves being able to be fastened to the tubular handlebar by threaded fasteners which are able to clamp the two sleeve-halves about the tubular handlebar, the threaded fasteners being able to pass through a first of the two sleeve-halves into at least one threaded bore of a second of the two sleeve-halves.

4. The handlebar assembly of claim 2, wherein the clamp-rib is retractable by a lever, the lever being rotatably mounted within the attachment-member.

5. The handlebar assembly of claim 2, wherein the at least one clamp is bifurcated into an extension-end and a clamp-cap, each of the extension-end and the clamp-cap having inner clamp-surfaces able to circumscribe one-hundred-and-eighty degrees of the ribbed sleeve, the clamp-cap being able to be bolted to the extension-end about the tubular handlebar and alternatively about the ribbed-sleeve.

6. The handlebar assembly of claim 2, wherein the at least one ribbed sleeve has flanges bounding the left and right ends of the at least one ribbed sleeve, such that the flanges extend radially above the plurality of ribs, the flanges preventing the at least one clamp from migrating left or right off of the at least one ribbed sleeve when indexed to and clamped about the plurality of ribs.

7. The handlebar assembly of claim 1, wherein the extension-member is perpendicular to the axis of the circular inner surface of the at least one clamp.

8. The handlebar assembly of claim 1, wherein each of the coaxial circular clamps are joined to the extension-member by a Y-shaped yoke.

9. The handlebar assembly of claim 1, wherein the extension-member is a unitary tubular member.

10. The handlebar assembly of claim 2, wherein each of the plurality of ribs and the clamp-rib are each rectangularly shaped.

11. The handle-bar assembly of claim 2, wherein the clamp-rib is spring-loaded into a protruded position.

12. A handlebar assembly able to attach to a bicycle, the handlebar assembly enabling a bicycle-operator to assume a recumbent posture while operating the bicycle, the handlebar assembly comprising:
an attachment-member able to affix around a tubular handlebar, the attachment-member comprising at least one clamp, the at least one clamp having a circular inner surface, the circular inner surface circumscribing an axis;
a handlebar-member comprising at least two handles, and
an extension-member vertically separating the handlebar-member from the attachment-member by a sufficient distance to enable the operator to lean backwards from a vertical posture while grasping the handlebar-member;
wherein the at least one clamp comprises two coaxial circular clamps, each of the coaxial circular clamps able to affix to the tubular handlebar;
further comprising at least one ribbed sleeve able to circumscribe the tubular handlebar, the at least one ribbed sleeve including a plurality of ribs protruding radially about an exterior of the at least one ribbed sleeve, and wherein each of the coaxial circular clamps comprises a clamp-rib which is complementary and indexable to the at least one ribbed sleeve, such that when each of the coaxial circular clamps is affixed over the at least one ribbed sleeve, the clamp-rib indexes to the at least one ribbed sleeve, and each of the coaxial circular clamps is securely fixed in an angular position around the tubular handlebar as restrained by the engagement of the clamp-rib with the at least one ribbed sleeve;
wherein the at least one ribbed sleeve is bifurcated into two sleeve-halves, the two sleeve-halves being able to be fastened to the tubular handlebar by threaded fasteners which are able to clamp the two sleeve-halves about the tubular handlebar, the threaded fasteners being able to pass through a first of the two sleeve-halves into at least one threaded bore of a second of the two sleeve-halves;
wherein the clamp-rib is retractable by a lever, the lever being rotatably mounted within the attachment-member;
wherein each of the coaxial circular clamps is bifurcated into an extension-end and a clamp-cap, each of the extension-end and the clamp-cap having inner clamp-surfaces able to circumscribe one-hundred-and-eighty degrees of the ribbed sleeve, the clamp-cap being able to be bolted to the extension-end about the tubular handlebar and alternatively about the ribbed-sleeve;
wherein the at least one ribbed sleeve has flanges bounding the left and right ends of the at least one ribbed sleeve, such that the flanges extend radially above the plurality of ribs, the flanges preventing each of the coaxial circular clamps from migrating left or right off of the at least one ribbed sleeve when indexed to and clamped about the plurality of ribs;
wherein the extension-member is perpendicular to the axis of the circular inner surface of the at least one clamp;
wherein each of the coaxial circular clamps are joined to the extension-member by a Y-shaped yoke;
wherein the extension-member is a unitary tubular member;
wherein each of the plurality of ribs and the clamp-rib are each rectangularly shaped; and
wherein the clamp-rib is spring-loaded into a protruded position.

13. The handle-bar assembly of claim 1, wherein each of the at least one clamp comprises an apertured plate which is rigidly affixed to the extension-member, a U-bolt able to pass around the tubular handlebar and through the apertured plate, and two nuts to compress the U-bolt, the tubular handlebar, and the apertured plate together.

14. The handle-bar assembly of claim 12, further comprising a bicycle to which the handle-bar assembly is attached.

* * * * *